Nov. 9, 1965   M. BAILEY   3,216,238
APPARATUS FOR USE IN MEASURING WEAR RESISTANCE
Filed Feb. 19, 1962   5 Sheets-Sheet 4
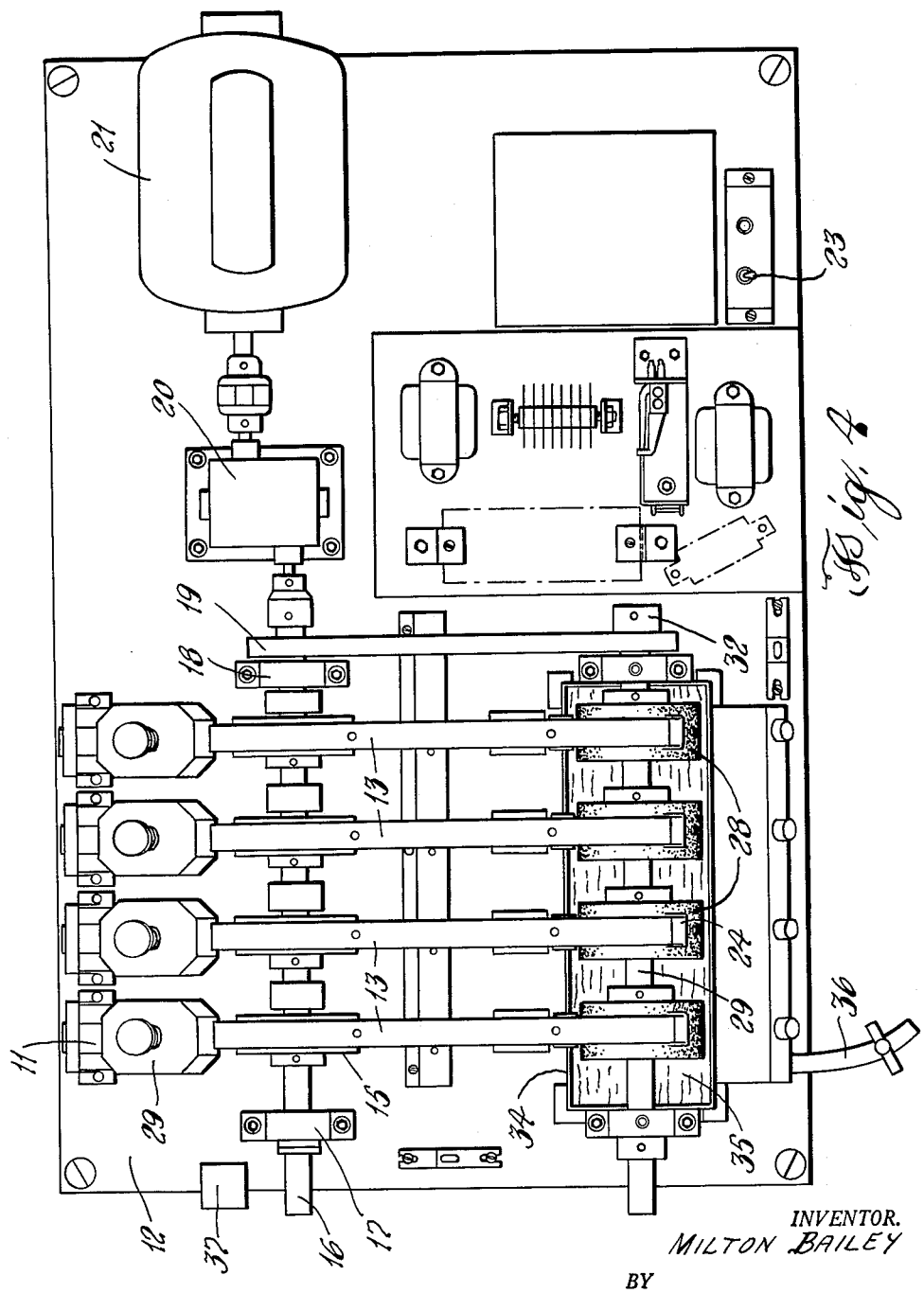
INVENTOR.
MILTON BAILEY
BY
Edward H Costigan
ATTORNEY

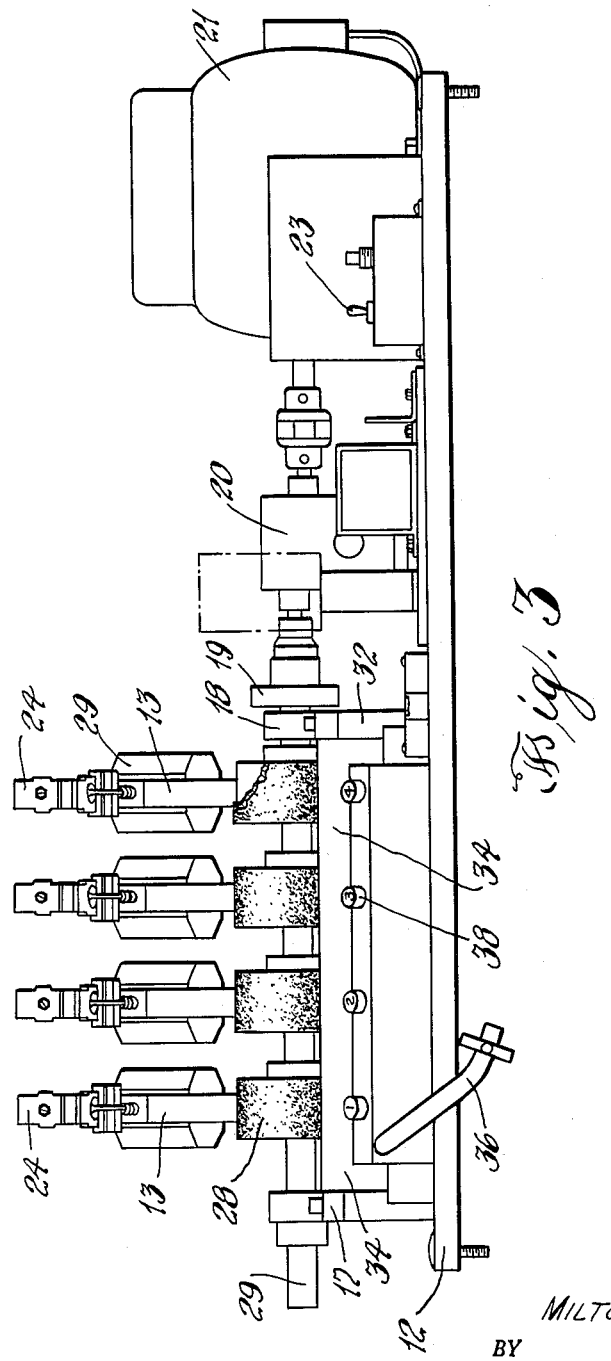

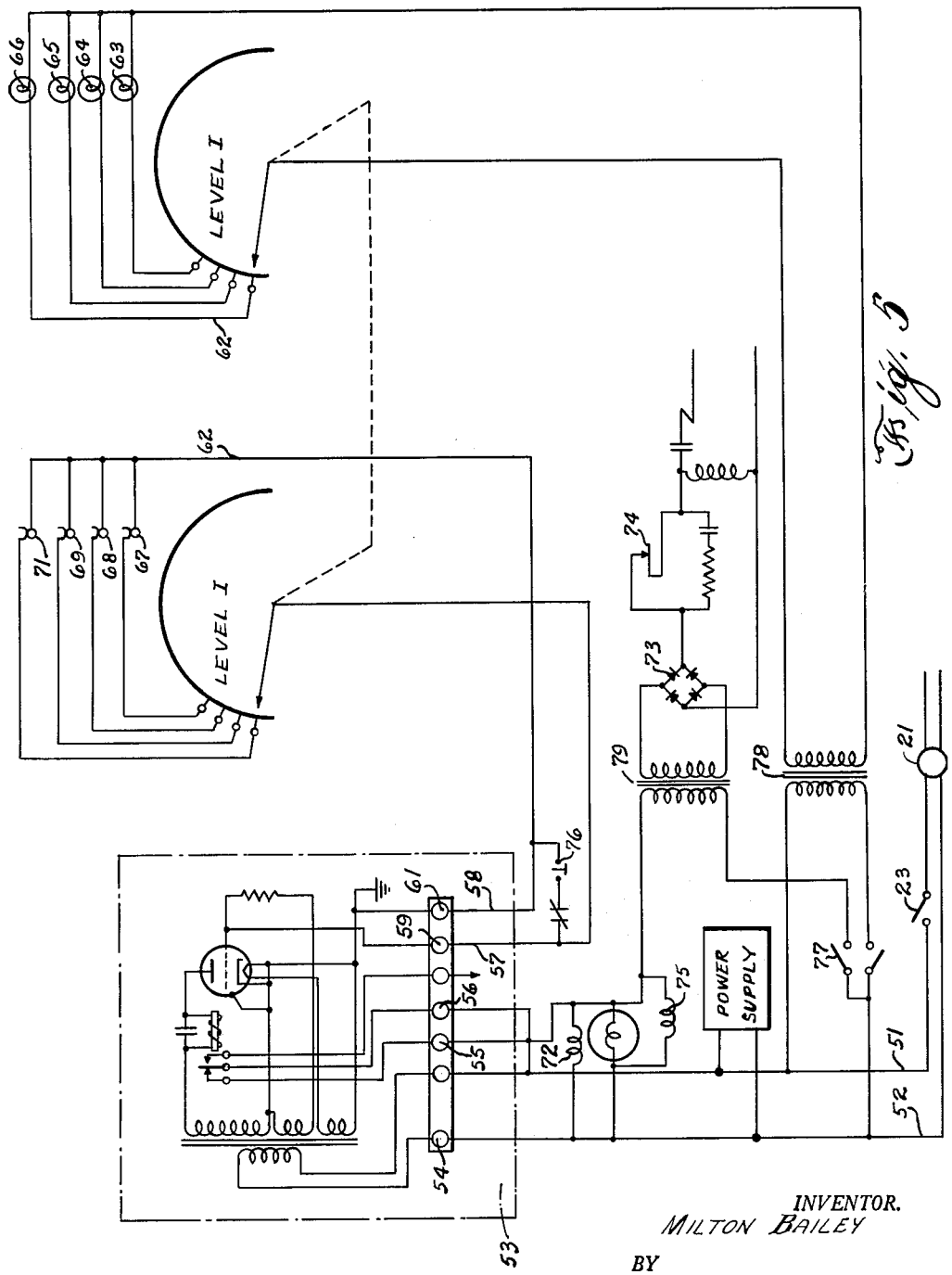

United States Patent Office 3,216,238
Patented Nov. 9, 1965

3,216,238
APPARATUS FOR USE IN MEASURING
WEAR RESISTANCE
Milton Bailey, 36 Kenilworth Place, Brooklyn, N.Y.
Filed Feb. 19, 1962, Ser. No. 174,321
2 Claims. (Cl. 73—7)
(Granted under Title 35, U.S. Code (1952), sec. 266)

The invention described herein may be manufactured and used by or for the Government of the United States of America for governmental purposes without the payment of any royalties thereon or therefor.

This invention relates to a wear-resistance test and particularly to the use of an improved apparatus in measuring the wear-resistance of leather soles for shoes.

It is well known that the shoe industry as a whole seeks a more realistic basis for the selection of leather batches which are to be used in footwear. However, it is quite difficult to select objective standards which will predict the actual serviceability or wear resistance of leather when it is used as soles in shoes. To date, the relating of the performance of a sole under testing conditions to the performance of the same sole under actual wearing conditions is still a pioneer problem. For instance, subjective sole sorting methods are not always reliable. Also, many of the static physical or chemical testing procedures are not applicable to a number of leathers which are now in use as soles. In addition, simple leather abrasive studies do not generally correlate with the results obtained when the shoes are actually worn in the field.

I have discovered an improved apparatus for use in testing leather sections which are destined to be soles in shoes. The results obtained by testing leather with this apparatus correlate quite well with the actual wear resistance of a shoe sole made from the same leather. The underlying reason for the correlation lies in the realization that a shoe sole is not merely subjected to a series of individual and unrelated stresses and, therefore, wear resistance cannot be predicted from the results of a series of individual tests. In actuality, the sole of a shoe during a normal life span is subjected to a complex series of simultaneous stresses, strains, and abrasions under environmental conditions which are both mild and physically harsh. The apparatus of the present invention simulates these complex conditions and, as a result, the data obtained through the use of this apparatus correlates with the actual wear resistance of soles.

This invention in general comprises the simultaneous flexing and abrading of a leather sole under a variety of environmental conditions through the use of an improved apparatus comprising a rotary nylon anvil suspended in a fluid environmental bath, an abrasive sleeve provided on the face of said anvil, a pivotally mounted arm supporting a leather specimen bent in the form of an arc and a power driven cam actuating said arm causing said specimen to intermittently contact said abrasive sleeve resulting in the simultaneous flexing and abrading of said leather specimen while in contact with said fluid environment.

FIG. 3 is a front elevation with a cross section cut away showing the abrasive sleeve and anvil of the apparatus.

FIG. 4 is a top plan view showing the environmental fluid through which the anvil whirls.

FIG. 5 is a diagrammatic view of the wiring embodied in the apparatus.

Figure 1:
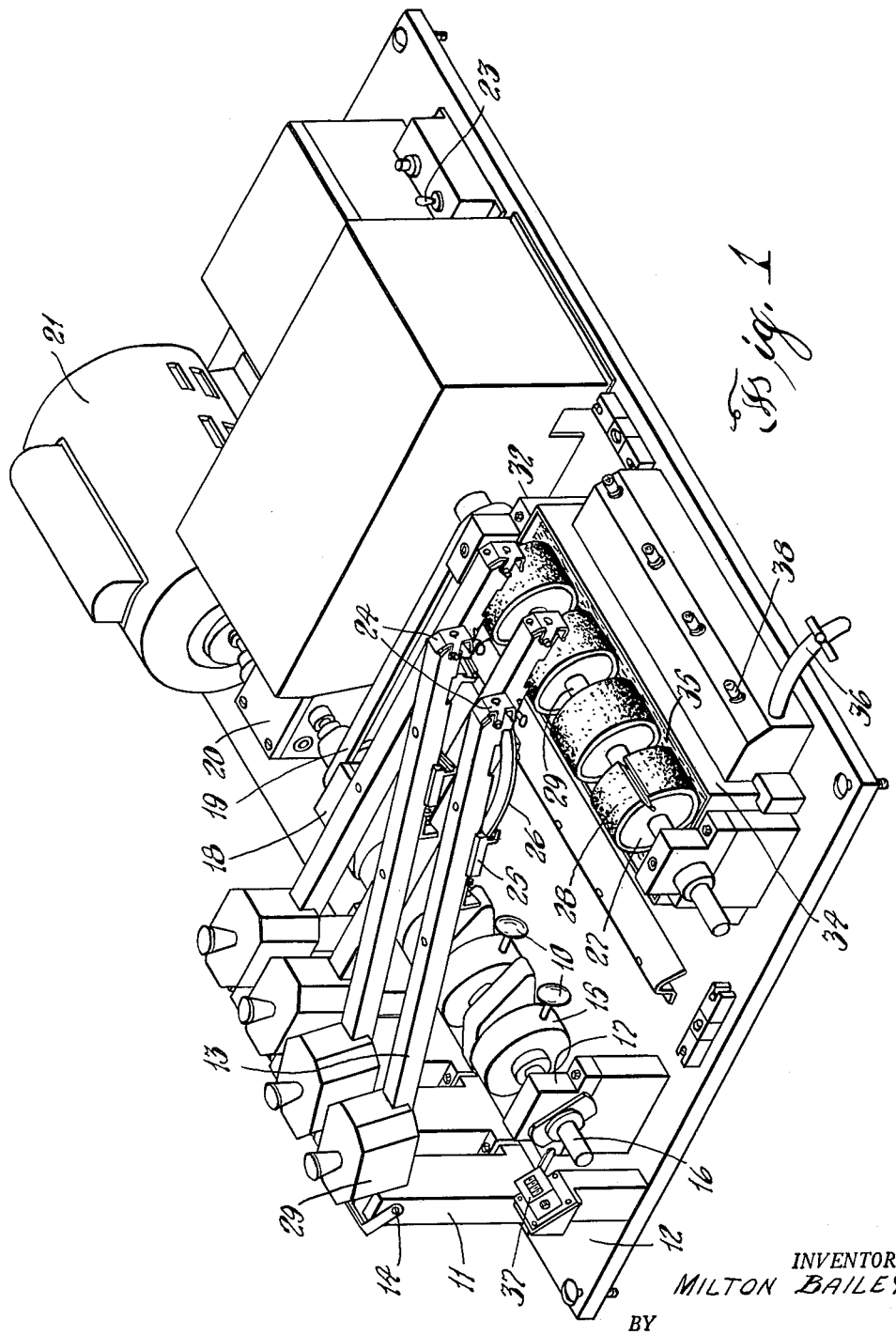
FIG. 1 is a perspective view of the apparatus for use in testing the wear-resistance of leather.

More specifically, the improved apparatus which is used in the present invention, as shown in FIG. 1, comprises a plurality of testing units. Each unit includes a support 11 which is mounted on a base 12. The upper extreme end of the support 11 is bifurcated, as shown, in order to receive and accommodate one end of arm 13 which is pivoted on pin 14. A power driven cam 15, which is fitted with an adjustable stud 10, is positioned below the arm 13 in such a manner that one revolution of the cam 15 alternately raises and drops the free end of arm 13. The cam 15 is rigidly mounted on a movable shaft 16 which is journalled in bearings within supports 17 and 18. The rotatable movement of shaft 16 is controlled by belt 19 which is driven by a motor 21 through a set of couplings 22 and a gear train enclosed in a casing 20. The motor 21 is controlled by switch 23 with the necessary connections to a source of electric power.

Figure 2:
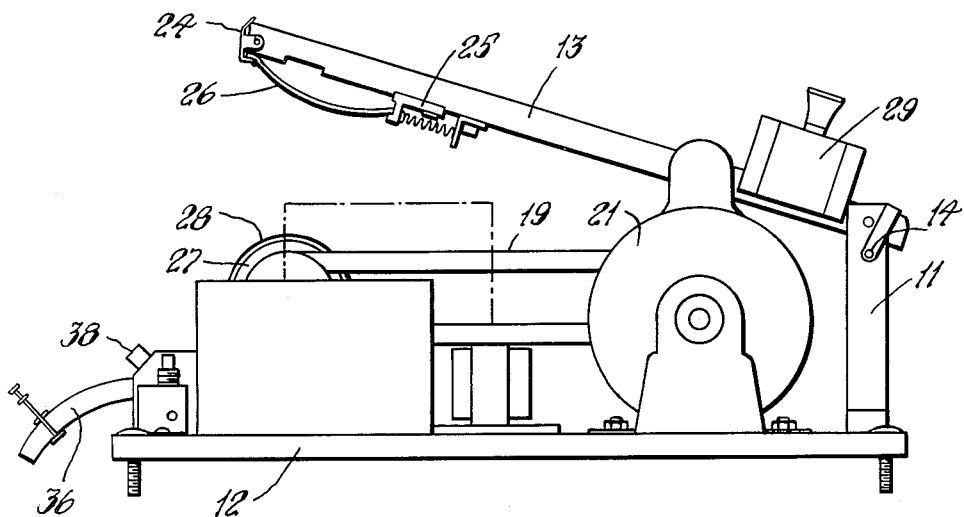
FIG. 2 is a side elevation showing a specimen in place in the testing arm of the apparatus.

As shown in FIG. 2, a spring clip 24 and a spring actuated flexer 25 are mounted on arm 13. The spring clip 24 is secured to the free end of the arm, while the flexer 25 is slidably mounted on the underside of the same arm. A specimen of leather 26 is bent and then inserted between the flexer 25 and the clip 24. The spring actuated flexer pushes the specimen 26 towards the clip 24 so that it is secured in position in the shape of an arc.

As the test proceeds, the free end of arm 13 is alternately raised and dropped causing the outer surface of the arced portion of the specimen 26 to be pressed against the contacting surface of the rotating anvil 27. The anvil is made of nylon and is provided with an abrasive sleeve or contact surface 28. A variety of water resistant cowhide abrasive cloths may be used for this purpose and it is preferred to have the coarseness of the cloth between 60X and 120X. The weight of the arm 13 ultimately determines the degree of flex and strain which the specimen 26 is subjected to during impact and the abrading operation. This is adjustable because metal weights 29 which vary in weight from ½ to 3½ pounds may be mounted at different positions on the upper surface of the arm 13. The anvils 27, as shown in FIG. 3, are rigidly supported on a rotating shaft 29 which is journalled in bearings within supports 31 and 32. This shaft 29 is rotated by the motor 21 through the use of couplings and a pulley belt 19. As shown in FIG. 4, the anvils 27 are suspended in a fluid bath 34. The fluid 35 in the bath is used to simulate the environmental conditions under which actual wear in the field may take place. The fluid may be simply water, or it may be acidic, basic or organic in nature depending on the environmental conditions that it is desired to simulate. The bath 34 is provided with a hose 36 which is used to drain the fluid from the bath when it is desired to change the environmental conditions of the test.

The following procedure is used in order to test a piece of leather for wear resistance: A piece of leather 4" x 1" is inserted between the clamp 24 and the spring actuated flexer 25. The spring forces the flexer 25 to push the leather specimen towards the clamp 24 resulting in an arcing of the specimen 26. A weight 29 is placed over the arced specimen and the switch 23 is turned to the "on" position thereby actuating the motor 21. In each cycle or stroke of the cams, the free end of the pivoted arm 13 falls down towards the anvil 27 resulting in the specimen 26 being flexed and flattened against the abrasive sleeve 28 of the anvil while the anvil is being whirled through the environmental fluid in the bath 34. The specimen is then held against the wet abrasive sleeve 28 of the anvil by the downward pressure exerted by the metal load 29 until the rotating cams 15 lift the pivoted arm 13. In this way, the leather specimen 26 is simultaneously flexed, strained, and abraded under a specified pressure and under a specified environmental condition. As the cams 15 lift the pivoted arm 13, the pressure against the specimen 26 is released and the specimen flexes to its original position in the shape of an arc. The flexing and abrading action is repeated until the fluid environment has penetrated the sample, at which time, the motor is manually shut off and the number of cycles or strokes are noted on the counter 37. If the specimen is penetrated by an environmental fluid consisting of water, the electronic circuit shown in FIG. 5 will be completed and the motor will automatically stop. In this case, a signal light 38 on the dashboard of the machine will indicate which particular sample was penetrated.

As set forth in FIG. 5, the wire switch 23 starts the 110-volt, 60-cycle, ¼ horsepower motor 21 which rotates the cams 15 and the anvils 27 of the instrument. The lead wires 51 and 52 carry the house current to Model 8282 Ripley electronic switch 53 and the motor via terminals 54, 55, and 56. During operation under wet conditions, when water penetrates the thickness of the leather sample after repeated flexing, and the resistance of the specimen is reduced below 3 megohms, a micro current energizes the electronic switch that cuts off the motor 21. Operated in this manner, the instrument determines specimen wear and water resistance simultaneously, based on thickness loss and number of cycles required to effect cut-off and penetration. If it is desired to operate the tester for a fixed number of cycles without electronic interference wet or dry, the lead wires 57 and 58 to terminals 59 to 61 may be disconnected. Since specimen resistance is generally higher than 3 megohms, terminals 59 and 61 need not be disconnected during dry operation. A hammer or probe is either in continuous or intermittent contact with a test specimen. There are four probes and each is connected to terminal 59 through any one of five positions in the stepping switch. Terminal 61 is a common contact. The stepping switch 62 is a two-level type with 20 steps operated by a 24-volt D.C. current. Level I is connected to four signal lights numbered 63, 64, 65 and 66. Each of the signal lights and each of the four probes are connected by five different steps at each level and separated by intervals of three steps. The steps connecting the lights and those connecting the probes 67, 68, 69, and 71 coincide. When specimen No. 1 fails, the switch may cut off at any of the following steps, viz 1, 5, 9, 13, and 17 and light 63 signals the failure. Normally closed relay 72 assures instantaneous motor cut-off when a specimen fails. Relay 72 shorts out the electronic circuit at terminals 59 and 61 which stops the motor and prevents the tester from starting up again. Failure to include relay 72 shorting function, enables the motor's inertial rotation to open the electronic circuit which starts up the motor. When the electronic circuit is not operative, the transformer 79 is energized. This causes the rectifier 73 to release a 24-volt D.C. current which simultaneously energizes the coils of both a slow-down relay 74 and the solenoid of the stepping switch 62. When the coil of the relay 74 attracts its armature, the coil of switch 62 simultaneously attracts its armature and this causes both coils to be deenergized. In this way, two armatures move up and down at a slow down rate while transformer 79 is energized. As the armature of switch 62 moves up and down, a ratchet attached to it rotates Level I and II arms. When a specimen failure occurs, the transformer 79 is deenergized and relay 75 interrupts the current. This interruption inhibits the inertial mover of the armature of switch 62. The pushbutton switch 76 deenergizes the electronic circuit and starts up the motor when required. Switch 77 cuts out stepping switch 62 and the bank of lights during dry runs. Transformer 78 feeds a 24-volt current to the signal lights. A spark suppressor consisting of a 10-ohm resistor and 0.5 mf. condenser is connected to the slow down interrupter on relay 74.

The number of cycles required for the environmental fluid to penetrate the leather specimen is a direct measurement of the actual wear-resistance of a sole under the same conditions. When a shoe is in actual use, the sole undergoes exposure to a unique series of conditions and these are well known. They include a continuous wetting under both normal and excessively high temperature, exposure to an acidic and basic environment and to fluid combinations of distinctive organic compounds. If these conditions were duplicated during a simultaneous flexing and abrading of the sole, one would duplicate the actual experience of a sole during a normal life span. Through the use of the present apparatus the major deteriorating mechanism i.e. flexing and abrasion can be conducted under each of these conditions. The results received from this series of tests would yield an index of wear under varying conditions and this would essentially correlate with actual wear in the field. Thus, a numerical standard of the wear-resistance of a leather may be obtained by testing the leather with this apparatus and this standard may be used for purposes of selecting the correct leather for use as soles in shoes.

Obviously there are many modifications and variations which are possible in view of the above teaching. For instance, the apparatus may be used to test the wear-resistance of upper leather of shoes or other materials rather than leather soles. It is therefore to be understood that these modifications and variations are to be included within the scope of the appended claims.

I claim:
1. A sole-leather wear resistance testing apparatus comprising
   a fluid environmental bath,
   a rotatable nylon anvil suspended in said bath,
   an abrasive sleeve having a coarseness between 60X and 120X secured on the face of said anvil,
   a pivotally mounted arm,
   a clip and a spring actuated clamp for flexing a sample, said clip and said clamp being mounted on said arm,
      said clip and said clamp being adapted to grip opposite ends of a sole-leather specimen in the form of an arc
   and a power driven cam coupled to said arm for the actuation of said arm to cause said specimen to intermittently contact said abrasive sleeve,
      whereby said specimen is subjected to a simultaneous stressing, straining, and abrading action while in contact with said fluid environment.
2. A sole-leather wear resistance testing apparatus comprising
   a water bath,
   a rotatable nylon anvil suspended in said bath,
   an abrasive sleeve having a coarseness between 60X and 120X secured on the face of said anvil,
   a pivotally mounted arm,
   a clip and a spring actuated clamp for flexing a sample, said clip and said clamp being monuted on said arm,
      said clip and said clamp being adapted to support a sole-leather specimen in the form of an arc, a power driven cam coupled to said arm and adapted to cause said specimen to intermittently contact said abrasive sleeve
    whereby said specimen is subjected to a simultaneous stressing, straining, and abrading while in contact with said fluid environment,
and electrical circuit means to halt the rotatable movement of said anvil and said cam in response to penetration of said leather specimen by said water.

References Cited by the Examiner

UNITED STATES PATENTS

| | | | |
|---|---|---|---|
| 2,458,953 | 1/49 | Mann | 73—7 |
| 2,721,473 | 10/55 | Allen et al. | 73—7 |
| 2,942,463 | 6/60 | Mann et al. | 73—7 X |
| 3,028,755 | 4/62 | Carter | 73—7 X |

RICHARD C. QUEISSER, *Primary Examiner.*

DAVID SCHONBERG, *Examiner.*